(12) United States Patent
Hsu

(10) Patent No.: US 9,106,093 B2
(45) Date of Patent: Aug. 11, 2015

(54) CONTACTLESS POWER TRANSMISSION STRUCTURE OF LASER DISTANCE MEASURING DEVICE

(75) Inventor: Wei Hsu, Taipei (TW)

(73) Assignee: WEISTECH TECHNOLOGY CO., LTD., Taipei (TW)

( * ) Notice: Subject to any disclaimer, the term of this patent is extended or adjusted under 35 U.S.C. 154(b) by 660 days.

(21) Appl. No.: 13/425,176

(22) Filed: Mar. 20, 2012

(65) Prior Publication Data
US 2012/0242162 A1    Sep. 27, 2012

(30) Foreign Application Priority Data

Mar. 22, 2011    (TW) .............................. 100109741 A

(51) Int. Cl.
| H02J 17/00 | (2006.01) |
| H01F 37/00 | (2006.01) |
| H01F 38/00 | (2006.01) |
| G01S 7/48 | (2006.01) |
| H02J 7/02 | (2006.01) |
| G01S 7/481 | (2006.01) |
| H02J 5/00 | (2006.01) |

(52) U.S. Cl.
CPC . *H02J 7/025* (2013.01); *G01S 7/48* (2013.01); *G01S 7/4817* (2013.01); *H02J 5/005* (2013.01); *H01F 37/00* (2013.01); *H01F 38/00* (2013.01); *H02J 17/00* (2013.01)

(58) Field of Classification Search
CPC ........... H02J 17/00; H02J 5/005; H01F 37/00; H01F 38/00; G01S 7/48; G01S 7/4817
USPC ........................................................ 307/104
See application file for complete search history.

*Primary Examiner* — Hal Kaplan
(74) *Attorney, Agent, or Firm* — Muncy, Geissler, Olds & Lowe, P.C.

(57) ABSTRACT

A contactless power transmission structure of a laser distance measuring device, comprising: a first circuit board, disposed on a rotation disk on an upper portion of a main axis, and on said first circuit board is provided with a laser light tube and a lens; a second circuit board disposed at an end of said main axis; a third circuit board, fixed on a bottom seat and is not rotatable; two signal receivers and two signal transmitters, to transmit signals to said laser light tube and said lens, and receive signals sent from said laser light tube and said lens; a motor, located on a side of said main axis, is connected to said main axis through a conveyer belt to make it rotate, and that brings said rotation disk to rotate; and a power structure, connected electrically and supplies power to said first, second, and third circuit board.

13 Claims, 4 Drawing Sheets

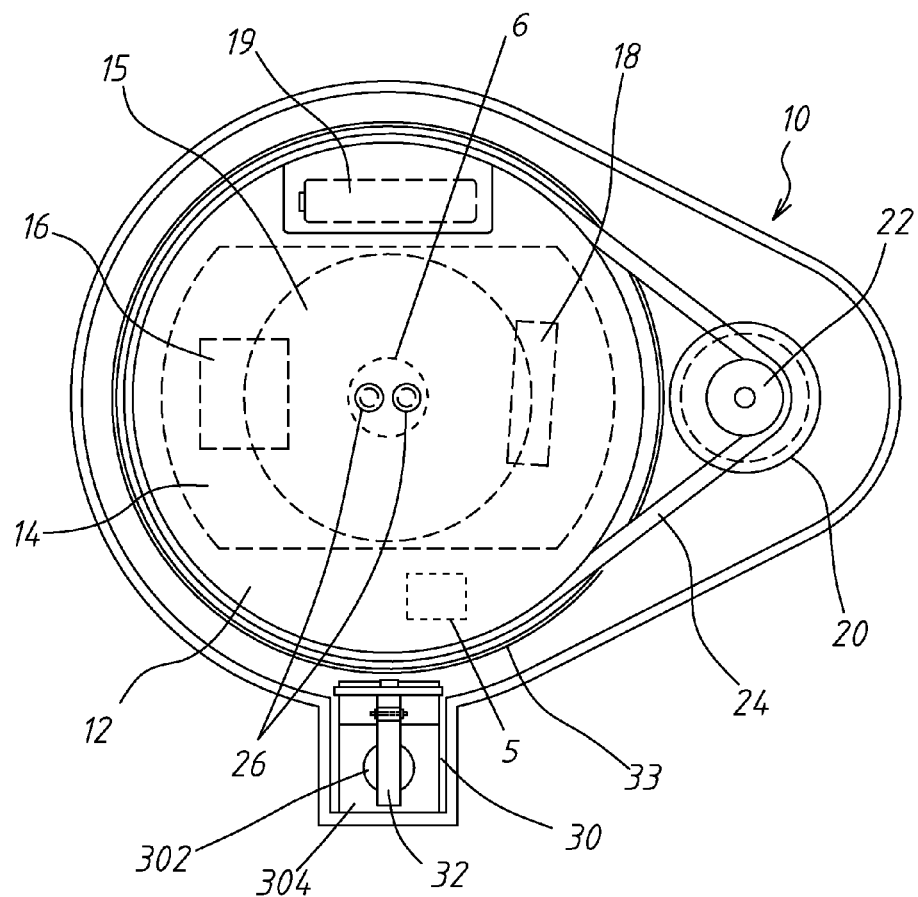
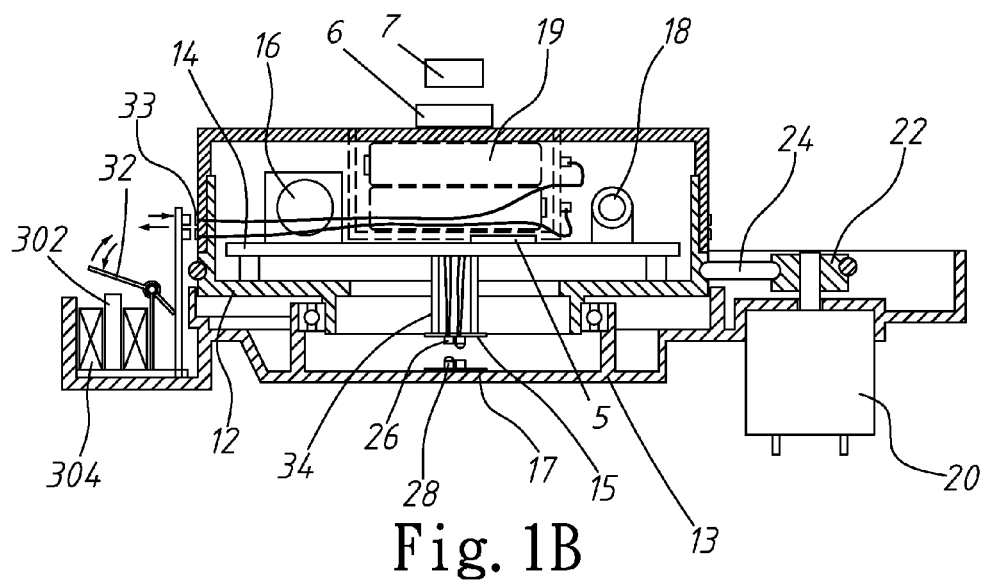
Fig. 1A
Fig. 1B

CONTACTLESS POWER TRANSMISSION STRUCTURE OF LASER DISTANCE MEASURING DEVICE

BACKGROUND OF THE INVENTION

1. Field of the Invention

The present invention relates to a power transmission technology, and in particular to a contactless power transmission structure of laser distance measuring device.

2. The Prior Arts

In general, distance measurement can be performed by means of various technologies, however, conventionally, there are problems and difficulties in measuring long distance correctly. With the progress of science and technology, advanced distance measurement device has been developed to measure distance, especially long distance accurately and precisely.

In this respect, the principle of laser distance measurement is to use laser to emit a laser light beam to an object, then light is reflected back to the light emission position, and the time required for transmission and reflection of light beam can be obtained, thus the distance in-between can be derived. To achieve this purpose, the laser distance measuring device must be provided with a laser light tube to emit laser light beam; a lens serving as a receiver to receive the reflected light; and a Digital Signal Processor (DSP) to calculate the difference of times between light emitted by the laser light tube and the reflected light received by the lens. Presently, 360 degrees rotatable laser distance measuring device is available and is capable of measuring long distance. However, since in a laser distance measuring device, the rotation disk having laser light tube and lens provided thereon is rotatable, therefore, in case that power is supplied through wire connections, it tends to wind together in operation and then be detached. Also, in repair and maintenance, the power supply portion can not be repaired separately, the whole unit of laser distance measuring device has to be replaced.

Therefore, the design and performance of laser distance measuring device is not quite satisfactory, and it has much room for improvements.

SUMMARY OF THE INVENTION

In view of the problems and shortcomings of the prior art, a major objective of the present invention is to provide a contactless power transmission structure of laser distance measuring device, so as to overcome the problems of the prior art.

A major objective of the present invention is to provide a contactless power transmission structure of laser distance measuring device, wherein, an electric-magnetic contact is turned on to charge a battery, and the battery is used to provide power for the entire laser distance measuring device.

Another objective of the present invention is to provide a contactless power transmission structure of laser distance measuring device. Wherein, the principle of power transformer coil current induction is used, to provide power to the laser distance measuring device through the induced current, generated by means of a stationary primary winding and a rotating secondary winding. The stationary primary winding and rotating secondary winding are disposed vertically or horizontally relative to each other, and a hollow column iron powder core having permeability is provided in between to raise power transmission efficiency.

A further objective of the present invention is to provide a contactless power transmission structure of laser distance measuring device, wherein a miniature generator is provided, and that is actuated by a motor to rotate to generate electricity required.

In order to achieve the above mentioned objective, the present invention provides a contactless power transmission structure of laser distance measuring device, including: a first circuit board, a second circuit board, a third circuit board, two signal receivers, two signal transmitters, a motor, and a power structure. Wherein, the first circuit board is disposed on the rotation disk on the upper portion of the main axis, and on the first circuit board is carried with a laser light tube and a lens, and it is electrically connected to the laser light tube and the lens; a second circuit board disposed on the bottom portion of the main axis, and a signal receiver is disposed at the bottom of the second circuit board; a third circuit board, disposed on the bottom seat, that is not rotatable, such that a signal transmitter is disposed on the third circuit board, the signal receiver and signal transmitter are used to transmit signals to the laser light tube and lens, and receive signal sent from the laser light tube and lens; a motor, located on a side of the main axis, connected to the main axis through a conveyor belt to bring the main axis into rotation, and that in turn brings the rotation disk into rotation; and a power structure, connected electrically to a first, second, and third circuit boards, to generate electricity to drive the first, second, and third circuit boards into action through battery charging, and transformer, generator, and photoelectric conversion principles.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which:

FIGS. 1A and 1B are a top view and a cross section view respectively of a power structure using an electric-magnetic contact battery charging to supply power according to a first embodiment of the present invention;

DETAILED DESCRIPTION OF THE PREFERRED EMBODIMENT

Figure 2A:
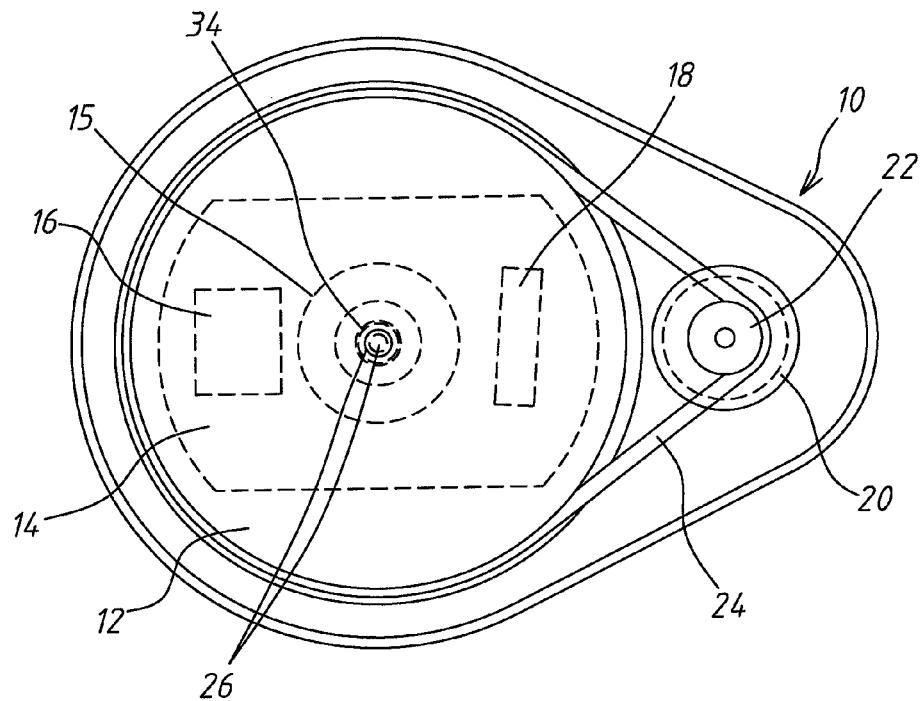
FIGS. 2A and 2B are a top view and a cross section view respectively of a power structure using a transformer having induction coils disposed horizontally to each other to supply power according to a second embodiment of the present invention.

The purpose, construction, features, functions and advantages of the present invention can be appreciated and understood more thoroughly through the following detailed description with reference to the attached drawings.

The present invention provides a contactless power transmission structure of laser distance measuring device, so that power is provided to the device in a contactless way without the need of electrical wires, to eliminate the problem that electrical wires be wound up and then detached during rotation of the device.

Refer to FIGS. 1A and 1B for a top view and a cross section view respectively of a power structure using an electric-magnetic contact battery charging to supply power according to a first embodiment of the present invention. As shown in FIGS. 1A and 1B, in the first embodiment of the present invention, the laser distance measuring device 10 includes a rotation disk 12 on its upper portion, which carries a first circuit board 14, a laser light tube 16, a lens 18, and a battery 19. Wherein, the laser light tube 16, lens 18, and battery 19 are all disposed on the first circuit board 14, such that when the rotation disk 12 rotates, the laser light tube 16 is able to make wide scope scanning, and the lens 18 is able to fetch images around in a wide range. On the first circuit board 14 is further provided with a plurality of circuit chips, including a digital signal processor (DSP) chip 5 electrically connected to the laser light tube 16 and the lens 18, to process the photoelectric signals sent from the laser light tube 16 and the lens 18.

A second circuit board 15 is provided on the bottom portion of the hollow main axis 34 in a low portion of the rotation disk 12, and a third circuit board 17 is provided on a bottom seat 13 of the laser distance measuring device 10, Two signal transmitters 28 and two signal receivers 26 are arranged in two groups, and are disposed on the bottom portion of the third circuit board 17 and on the second circuit board 15 respectively. The two signal receivers 26 are respectively an infrared external signal receiver and an infrared internal signal receiver, and the two signal transmitters 28 are an infrared external signal transmitter and an infrared internal signal transmitter. Wherein, the infrared external signal transmitter is disposed on the third circuit board 17, and it transmits the external signal to the infrared external signal receiver, and the infrared internal signal transmitter is disposed on the second circuit board 15, and it transmits the internal signal processed by the laser light tube 16, lens 18 to the infrared internal signal receiver. A motor 20 is disposed beside the rotation disk 12, and the upper portion of the motor 20 is connected a conveyor belt wheel 22, and a conveyer belt 24 is wound around the conveyor belt wheel 22 and the rotation disk 12, so that when the motor 20 rotates, it will bring the conveyer belt wheel 22 to rotate in synchronism, and that would bring the rotation disk 12 into rotation, hereby enabling the laser light tube 16 and the lens 18 to make 360-degree scanning and image fetching.

In the first embodiment of the present invention, the power structure is a electric-magnetic contact 30 on an outer side of the rotation disk 12, the electric-magnetic contact 30 includes: an electric-magnet structure made of an iron core 302 and a coil 304 wound around the iron core 302; and at least a contact plate 32. On the outer portion of the laser distance measuring device 10 is provided with at least contact point 33, which is a round-shape copper foil, connected electrically to a battery 19, such that when the outside power supply comes in, the contact point 33 guides the outside power supply to charge the battery 19 via the contact plate 32, and this battery 19 supply the power for the entire laser distance measuring device 10; and when the outside power supply is disconnected, the contact plate 32 releases the electric-magnetic contact point to cease charging the battery 19, that is a storage battery.

Figure 2B:
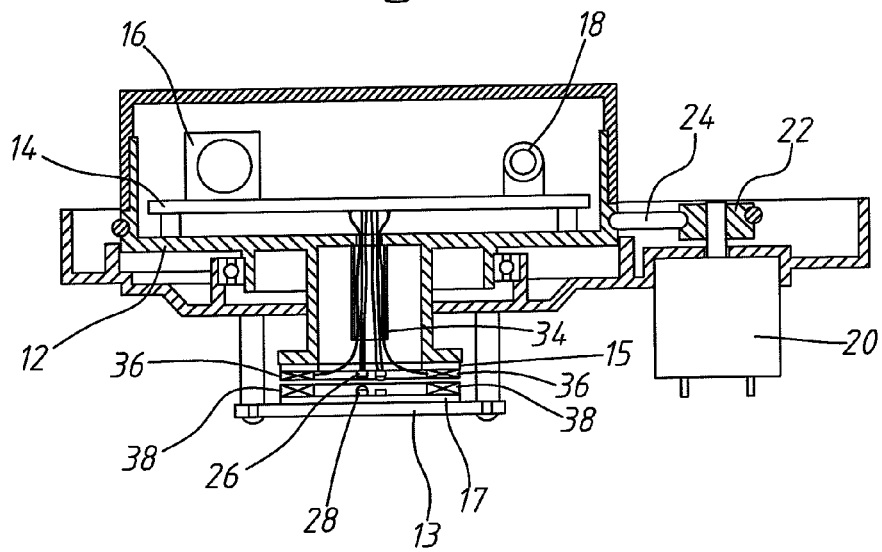

Then, refer to FIGS. 2A and 2B for a top view and a cross section view respectively of a power structure using a transformer to supply power according to a second embodiment of the present invention. As shown in FIGS. 2A and 2B, on the rotation disk 12, only a first circuit board 14, a laser light tube 16, and a lens 18 are provided, in the center downward of the rotation disk 12 is provided with a hollow main axis 34, with its end provided with a second circuit board 15, and on the bottom seat 13 is provided with a third circuit board 17. In the present embodiment, two signal transmitters 28 and two signal receivers 26 arranged into two groups are disposed on the third circuit board 17 and the bottom portion of the second circuit board 15, their functions are the same as those of the first embodiment, and they will not be repeated here for brevity. The power structure of the present embodiment includes a primary winding 38 and a secondary winding 36, such that the primary winding 38 is disposed on the third circuit board 17, and the secondary winding 36 is provided at the bottom portion of the rotation disk 12. In other words, the primary winding 38 is stationary, and the secondary winding 36 will rotate along with the rotation of rotation disk 12, four wires passing through the center of the main axis 34 are connected respectively to the primary winding 38 and the secondary winding 36, so that when an ultrasonic voltage is applied to the primary winding 38, the secondary winding 36 of the same area in rotation facing the primary winding 38 is induced a current, thus AC power is induced in the secondary winding 36 in realizing the transformer principle. In this embodiment, the primary winding 38 and the secondary winding 36 are ultrasonic induction coils, and are disposed horizontally to each other.

Figure 2C:
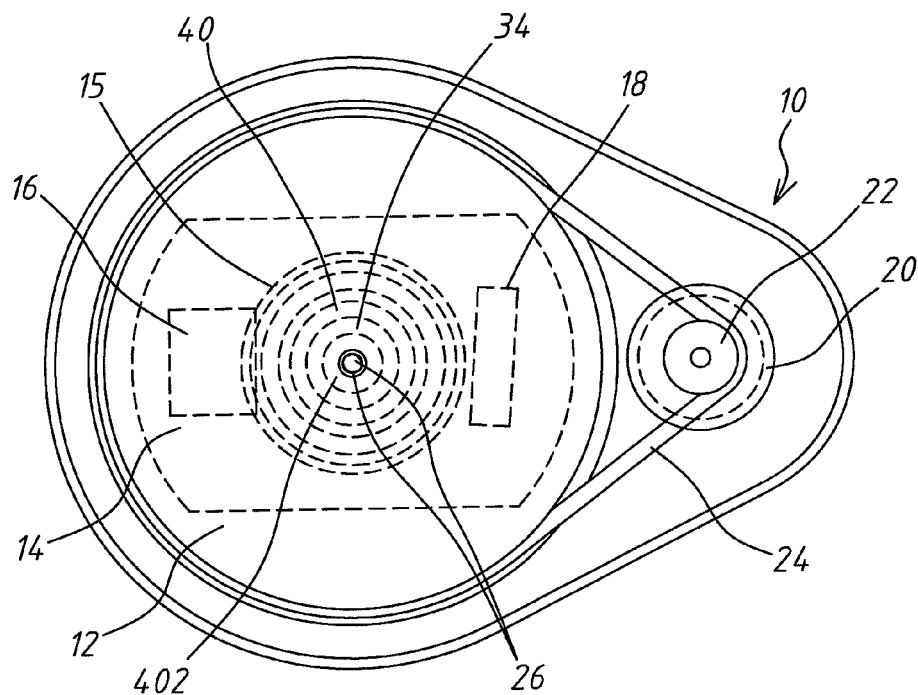
FIGS. 2C and 2D are a top view and a cross section view respectively of a power structure using a transformer having induction coils disposed vertically to each other plus a tube-shaped permeable body, to supply power according to a third embodiment of the present invention.
Figure 2D:
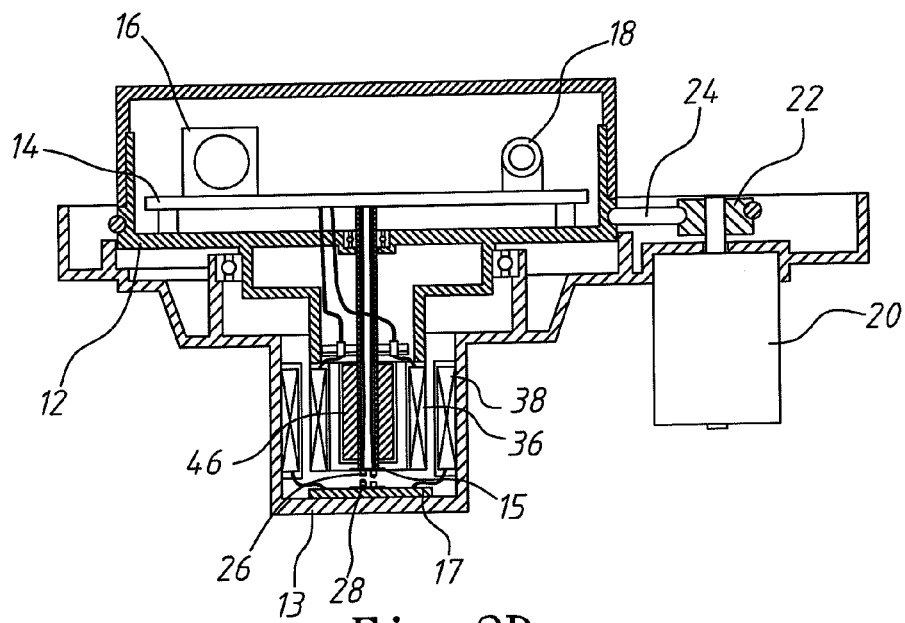

FIGS. 2C and 2D are a top view and a cross section view respectively of a power structure using a transformer having induction coils disposed vertically to each other plus a tube-shaped permeable body, to supply power according to a third embodiment of the present invention. As shown in FIGS. 2C and 2D, on the rotation disk 12, only a first circuit board 14, a laser light tube 16, and a lens 18 are provided. In the center downward the rotation disk 12 is provided with a hollow main axis 34. A generator 40 is provided at the bottom portion of the rotation disk 12, and the second circuit board 15 is disposed at the bottom portion of the generator 40, such that the first circuit board 14 and the second circuit board 15 are connected electrically to each other through the main axis 34, and on the bottom seat 13 is provided with a third circuit board 17. In the present embodiment, two signal transmitters 28 and two signal receivers 26 arranged into two groups are disposed on the bottom portion of the second circuit board 15 and on the third circuit board 17, their functions are the same as that of the first embodiment, and they will not be repeated here for brevity. The power structure of the present embodiment is a generator 40, including a primary winding 38, a secondary winding 36, and a tube-shaped material 46, such as magnetic or iron powder core, such that the tube-shaped magnetic material 46, the secondary winding 36, and the primary winding 38 are disposed parallel to each other outwardly, with the main axis as the center. Wherein, the secondary winding 36 and the tube-shaped magnetic material 46 are disposed around the main axis 24, and rotate along the rotation disk, the first circuit board 14 is connected electrically to the secondary winding 36. Applying ultrasonic voltage to the secondary winding 36, to induce and transfer AC power to the static primary winding 38 having the same area and located opposite to the secondary winding 36 with a small gap in between. The primary winding 38 is electrically connected to the third circuit board 17, to provide power to the signal transmitter 28 and signal receiver 26 on the third circuit board 17.

Figure 3A:
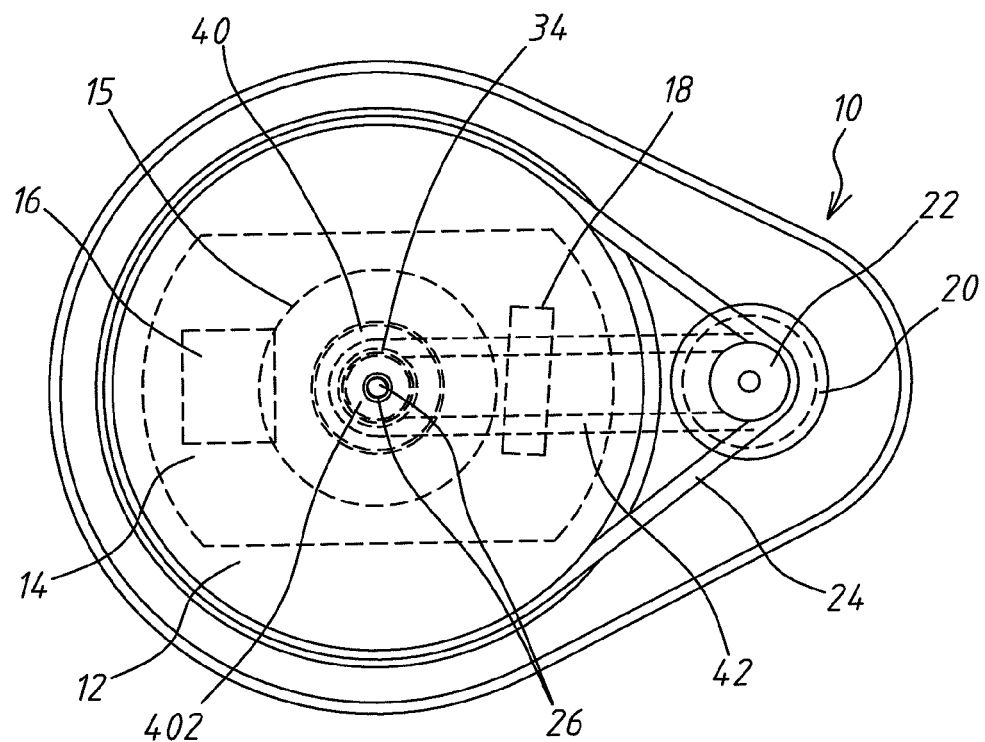
FIGS. 3A and 3B are a top view and a cross section view respectively of a power structure using a generator to supply power according to a third embodiment of the present invention.
Figure 3B:
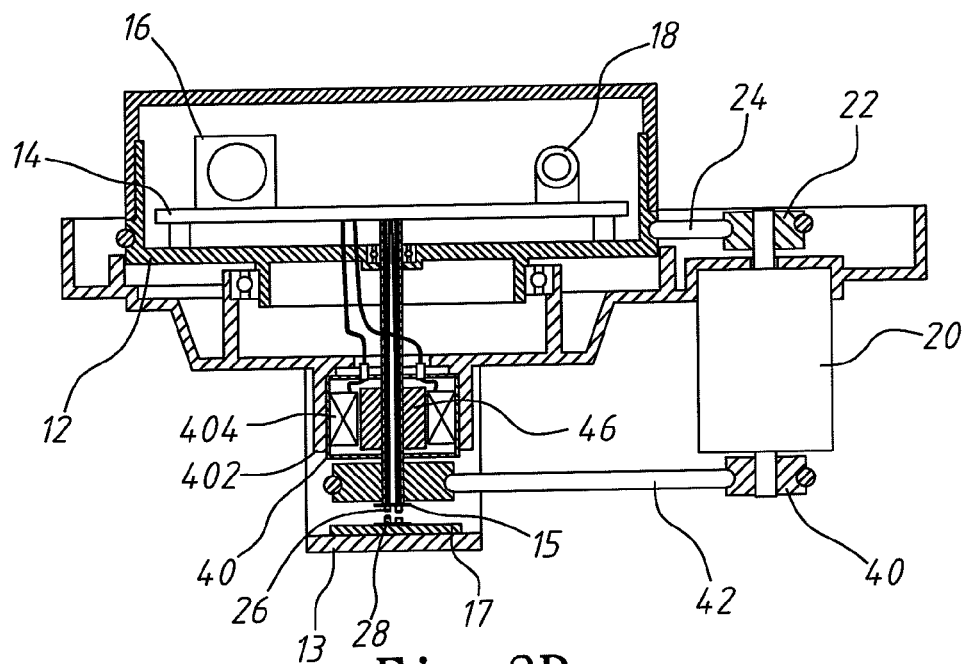

Finally, refer to FIGS. 3A and 3B for a top view and a cross section view respectively of a power structure using a generator to supply power according to a third embodiment of the present invention. As shown in FIGS. 3A and 3B, on the rotation disk 12, only a first circuit board 14, a laser light tube 16, and a lens 18 are provided, in the center downward of the rotation disk 12 is provided with a hollow main axis 34, a generator 40 is provided at the bottom portion of the rotation disk 12, and a second circuit board 15 is provided at the bottom portion of the generator 40, such that the second circuit board 15 is electrically connected to the first electrical board 14 through the main axis 34; in addition, a third circuit board 17 is provided on the bottom seat 13. In the present embodiment, two signal transmitters 28 and two signal receivers 26 arranged into two groups are disposed on the third circuit board 17 and the bottom portion of the second circuit board 15, their functions are the same as those of the first embodiment, and they will not be repeated here for brevity. The power structure of the present embodiment is a generator 40, which includes a magnet 402 and a coil 404, the magnet 42 is a permanent magnet, and the generator 40 is connected electrically to the first circuit board 14. In the present embodiment, the lower portion of the motor 20 is additionally provided with a coaxial second conveyer belt wheel 44, and a second conveyer belt 42 is wound around the second conveyer belt wheel 44 and the generator 40, so that when the motor 20 rotates, it will bring the conveyer belt wheel 22 and second conveyer belt wheel 44 into rotation, and that will in turn bring the rotation disk 12 and generator 40 to rotate, thus generating electricity. As such, when the coil 404 rotates, it will cut through the magnetic field of the magnet 402 in a near distance, to produce electric power on the coil of the rotation disk 12, and to provide power to other electronic components on the rotation disk 12.

In the present invention, in addition to the electric-magnetic contact to charge battery as shown in FIGS. 1A and 1B, the transformer principle to generate electricity as shown in FIGS. 2A and 2D, and the generator principle to generate electricity as shown in FIGS. 3A and 3B, a photoelectric conversion principle can also be used to irradiate a photoelectric converter 6 on a rotation disk with a fixed and strong light source 7 to produce electric power.

In the various embodiments of the present invention, the signal transmitters and signal receivers are all made of phototransistors.

Summing up the above, in the present invention, a contactless power transmission structure of laser distance measuring device is provided, and that is used in the following ways to produce power for the laser distance measuring device: utilize an electric-magnetic contact to connect to outside power supply to charge the battery; utilize transformer principle to produce induced current by means coil induction; utilize generator principle to rotate coil to cut through magnetic field of a magnet, to produce power on a corresponding coil; or utilize photoelectric conversion principle, to irradiate light on a photoelectric converter on a rotation disk, to convert photo energy into electric energy. In the present invention, the power structure and the laser light tube and the lens are not connected by wires, thus during rotation of rotation disk, no electrical wires will be wound together and be detached, also in case the power structure is damaged, it can be repaired and maintained separately without the need to remove the laser light tube and the lens.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A contactless power transmission structure of a laser distance measuring device, comprising:
    a first circuit board, disposed on a rotation disk on an upper portion of a main axis, and on said first circuit board is provided a laser light tube and a lens, and said first circuit board is electrically connected to said laser light tube and said lens;
    a second circuit board, disposed at an end of said main axis;
    a third circuit board, fixed on a bottom seat opposite to said end of said main axis;
    two signal receivers and two signal transmitters, disposed respectively on said second circuit board and said third circuit board, to transmit signals to said laser light tube and said lens, and receive signals sent from said laser light tube and said lens;
    a motor, located on a side of said main axis, connected to said main axis to make it rotate, and that in turn brings said rotation disk to rotate; and
    a power structure, connected electrically to said first, second, and third circuit boards, to generate electricity to drive said first, second, and third circuit boards into action.

2. The contactless power transmission structure of a laser distance measuring device as claimed in claim 1, wherein said two signal receivers are an infrared external signal receiver and an infrared internal receiver respectively, and said two signal transmitters are an infrared external signal transmitter and an infrared internal transmitter respectively.

3. The contactless power transmission structure of a laser distance measuring device as claimed in claim 1, further comprising: a battery, wherein said power structure is connected to an electric-magnetic contact, and said electric-magnetic contact is connected to a contact plate on an outer side of said rotation disk, to guide outside power supply to pass through said contact plate to charge said battery.

4. The contactless power transmission structure of a laser distance measuring device as claimed in claim 1, wherein said power structure is provided with a secondary winding under said second circuit board, and is provided with a primary winding on said third circuit board opposite to said secondary winding, such that when an ultrasonic wave voltage is applied on said primary winding, said secondary winding is induced to produce electric power.

5. The contactless power transmission structure of a laser distance measuring device as claimed in claim 4, wherein said primary winding and said secondary winding are ultrasonic wave induction coils, and are disposed horizontally to each other.

6. The contactless power transmission structure of a laser distance measuring device as claimed in claim 4, wherein said primary winding and said secondary winding are ultrasonic wave induction coils, and are disposed vertically to each other, with innermost layer embedded with a tube-shaped magnetic column.

7. The contactless power transmission structure of a laser distance measuring device as claimed in claim 1, wherein said power structure is provided with a hollow-pillar shape magnet and coil disposed between said second circuit board and said rotation disk to form a generator, such that when said motor brings said generator into rotation, induced current is produced on said coil.

8. The contactless power transmission structure of a laser distance measuring device as claimed in claim 1, wherein said two signal transmitters are disposed on said third circuit board, and said two signal receivers are disposed on said second circuit board.

9. The contactless power transmission structure of a laser distance measuring device as claimed in claim 1, wherein an axis of said motor passes through a conveyer belt wheel, and a conveyer belt is wound around said conveyer belt wheel to connect to said rotation disk, such that when said axis of said motor rotates, it will bring said conveyer belt wheel and said rotation disk to rotate.

10. The contactless power transmission structure of a laser distance measuring device as claimed in claim 7, wherein said generator is connected to said motor through said conveyer belt wheel and said conveyer belt, such that when said axis of said motor rotates, it will bring said conveyer belt wheel to rotate in synchronism, and also bring said generator to rotate through said conveyer belt, to produce electricity required.

11. The contactless power transmission structure of a laser distance measuring device as claimed in claim 1, wherein said power structure is a photoelectric converter, that uses a fixed light source to irradiate said photoelectric converter on said rotation disk to produce electric power.

12. The contactless power transmission structure of a laser distance measuring device as claimed in claim 1, wherein said first circuit board is further provided with a plurality of circuit chips containing a digital signal processor (DSP) chip, connected electrically to said laser light tube and said lens, to process photoelectric signals sent from said laser light tube and said lens.

13. The contactless power transmission structure of a laser distance measuring device as claimed in claim 1, wherein said signal transmitters and said signal receivers are made of phototransistors.

\* \* \* \* \*